Jan. 4, 1966   J. P. DE LORENZO   3,227,161

SYRINGE

Filed March 4, 1963

INVENTOR
Joseph P. DeLorenzo

BY
ATTORNEY

United States Patent Office 3,227,161
Patented Jan. 4, 1966

3,227,161
SYRINGE
Joseph P. De Lorenzo, 2819 Portsmouth, Houston, Tex.
Filed Mar. 4, 1963, Ser. No. 262,641
2 Claims. (Cl. 128—265)

This invention relates to a syringe, and it concerns more particularly an improved springe comprising a barrel, open at its ends, having a plunger reciprocable therein for use in introducing medication in the form of a dry powder into a body cavity.

It has been found, in the use of such syringes for the purpose described, that the barrel of the syringe may become caked or clogged with dry, powdered material to such extent that the plunger may become stuck therein so that it is not movable in either direction.

An object of the invention is to provide a syringe of the type described in which the barrel has a central bore coextensive with its length, said bore having a cylindrical portion beginning at its inlet end having a diameter corresponding substantially to the diameter of the plunger, which is cylindrical, and in which the bore of the barrel is gradually and progressively enlarged as it approaches its discharge end, beginning at a point spaced inwardly from its inlet end, to form a long taper extending longitudinally and radially outwardly in the direction of said discharge end, the tapered portion of the bore comprising a major portion of its length, whereby the plunger is freely movable in the tapered, gradually enlarged portion of the bore and does not tend to become stuck therein in the presence of dry, powdered material.

Another object of the invention is to provide a syringe as described in which the bore of the barrel has a beveled peripheral edge immediately adjacent its inlet end to facilitate introducing the plunger therein.

Another object of the invention is to provide such a syringe in which the outer peripheral surface of the barrel is cylindrical for a portion of its length beginning at its inlet end, and in which the outside diameter of the barrel is gradually and progressively reduced in the direction of its discharge end, beginning at a point spaced inwardly from its inlet end, to form a long taper extending longitudinally and radially inwardly in the direction of said discharge end, the tapered portion of the outer peripheral surface comprising a major portion of its length, whereby the syringe is adapted to be more readily introduced into a body cavity, and whereby the barrel is adapted to be more easily removed from a mold in which it is formed.

The invention will be readily understood by referring to the following description and the accompanying drawing, in which.

Figure 1:
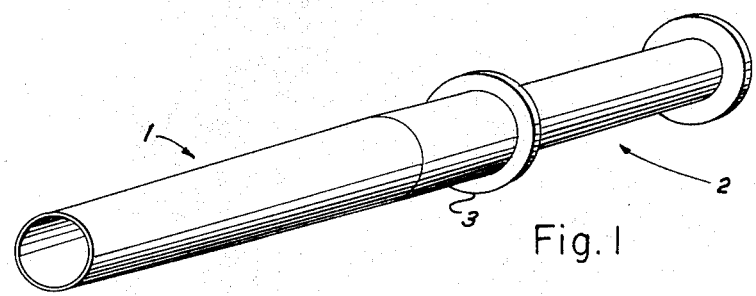
FIG. 1 is a perspective view of a syringe embodying the invention showing the plunger in its retracted position relative to the barrel.
Figure 2:
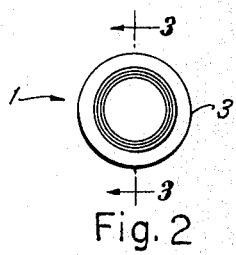
FIG. 2 is an end view of the barrel.
Figure 3:
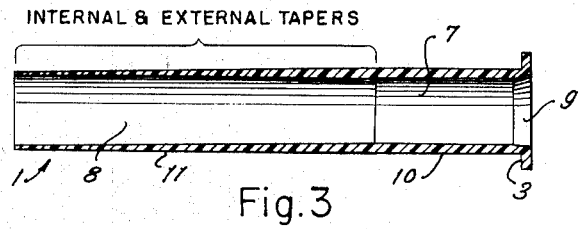
FIG. 3 is a longitudinal sectional view taken on the line 3—3 of FIG. 2.
Figure 4:
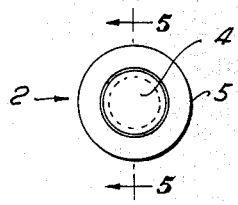
FIG. 4 is an end view of the plunger.
Figure 5:
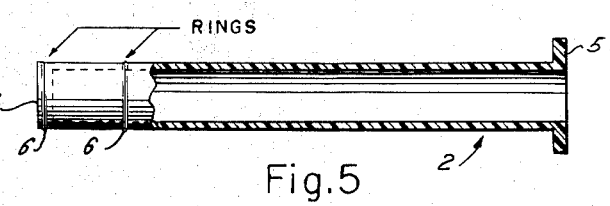
FIG. 5 is a longitudinal view, partly in section taken on the line 5—5 of FIG. 4.
Figure 6:
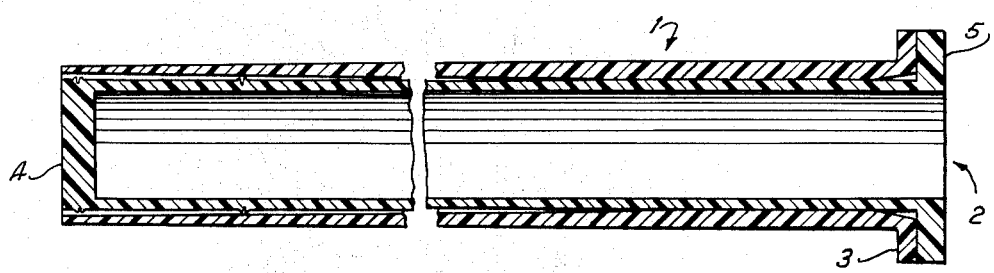
FIG. 6 is a longitudinal sectional view on an enlarged scale taken on a median line, showing the plunger in its advanced position relative to the barrel.
Figure 7:
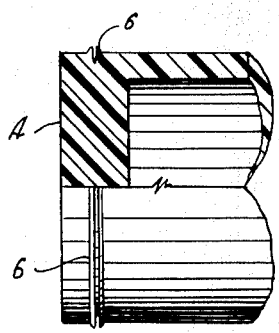
FIG. 7 is a fragmentary longitudinal view on an enlarged scale, partly in section taken on a median line, showing an end portion of the plunger.

Referring to the drawing, the syringe of the invention comprises a barrel, open at its ends designated generally by the numeral 1, having a plunger, indicated generally by the numeral 2, reciprocable therein.

The barrel 1 and the plunger 2 advantageously may be formed of molded plastic material, for example.

The barrel 1 has a radially outwardly extending peripheral flange 3 adjacent one of its ends, hereinafter referred to as its inlet end.

The plunger 2, which is cylindrical and advantageously may be of hollow, tubular construction, is closed at one of its ends, indicated by the numeral 4, hereinafter referred to as its inner end, and has a radially outwardly extending peripheral flange 5 adjacent its opposite end, hereinafter referred to as its outer end.

The flanges 3 and 5 are engageable by the fingers to move the plunger 2 longitudinally relative to the barrel 1.

The plunger 2 is of uniform diameter throughout substantially its entire length, and has a pair of peripheral rings 6 of relatively larger diameter adjacent its closed inner end. The rings 6 are formed by acting on the surface of the plunger 2 with a cutting tool to form an annular burr having corresponding raised and depressed portions.

The barrel 1 has a central bore 7 coextensive with a portion of its length, said bore having a cylindrical portion beginning at its inlet end having a diameter corresponding substantially to the diameter of the plunger 2.

The bore of the barrel 1 is gradually and progressively enlarged, as at 8, as it approaches its discharge end, beginning at a point spaced inwardly from its inlet end, to form a long taper extending longitudinally and radially outwardly in the direction of said discharge end, the tapered portion 8 of the bore comprising a major portion of its length, whereby the plunger 2 is freely movable in the tapered, gradually enlarged portion 8 of the bore and does not tend to become stuck therein in the presence of dry, powdered material.

The bore of the barrel 1 has a beveled peripheral edge 9 immediately adjacent its inlet end to facilitate introducing the plunger 2 therein.

The outer peripheral surface of the barrel 1 is cylindrical for a portion of its length beginning at its inlet end as at 10.

The outside diameter of the barrel 1 is gradually and progressively reduced, as at 11, in the direction of its discharge end, beginning at a point spaced inwardly from its inlet end, to form a long taper extending longitudinally and radially inwardly in the direction of said discharge end, the tapered portion 11 of the outer peripheral surface comprising a major portion of its length, whereby the syringe is adapted to be more readily introduced into a body cavity, and whereby the barrel 1 is adapted to be more easily removed from a mold in which it is formed.

The oppositely tapered inner and outer surfaces 8, 11 of the barrel 1 also assist in displacing the syringe from a body cavity as its contents are discharged therefrom.

The invention may be modified in various ways without departing from the spirit and scope thereof.

I claim:

1. A syringe for use in introducing medication in the form of a dry powder into a body cavity comprising a barrel, open at its ends, having a plunger reciprocable therein, said plunger being cylindrical, the outer peripheral surface of the barrel being cylindrical for a portion of its length beginning at its inlet end, and the outside diameter of the barrel being gradually and progressively reduced in the direction of its discharge end, beginning at a point spaced inwardly from its inlet end, to form a long taper extending longitudinally and radially inwardly in the direction of said discharge end, the tapered portion of the outer peripheral surface comprising a major portion of its length, whereby the syringe is adapted to be more readily introduced into a body cavity, and whereby the barrel is adapted to be more easily removed from a mold in which it is formed, the barrel having a central bore coextensive with its length, said bore having a cylindrical portion beginning at its inlet end having a diameter corresponding substantially to the diameter of the plunger, and the bore of the barrel being gradually and progressively enlarged in the direction of its discharge end, beginning at a point spaced inwardly from its inlet end, to form a long taper extending longitudinally and radially outwardly in the direction of said disharge end, the tapered portion of the bore comprising a major portion of its length, whereby the plunger is freely movable in the tapered, gradually enlarged portion of the bore and does not tend to become stuck therein in the presence of dry, powdered material.

2. The structure of claim 1, the bore of the barrel having a beveled peripheral edge immediately adjacent its inlet end to facilitate introducing the plunger therein.

References Cited by the Examiner

UNITED STATES PATENTS

| | | | |
|---|---|---|---|
| 1,604,915 | 10/1926 | Houser | 128—235 |
| 1,878,513 | 9/1932 | Haas | 128—266 |
| 2,354,477 | 7/1944 | Radbruch | 222—386 X |
| 2,358,998 | 9/1944 | Radbruch | 222—386 X |
| 2,702,548 | 2/1955 | Carlson | 128—235 |

LAVERENE D. GEIGER, *Primary Examiner.*